United States Patent Office

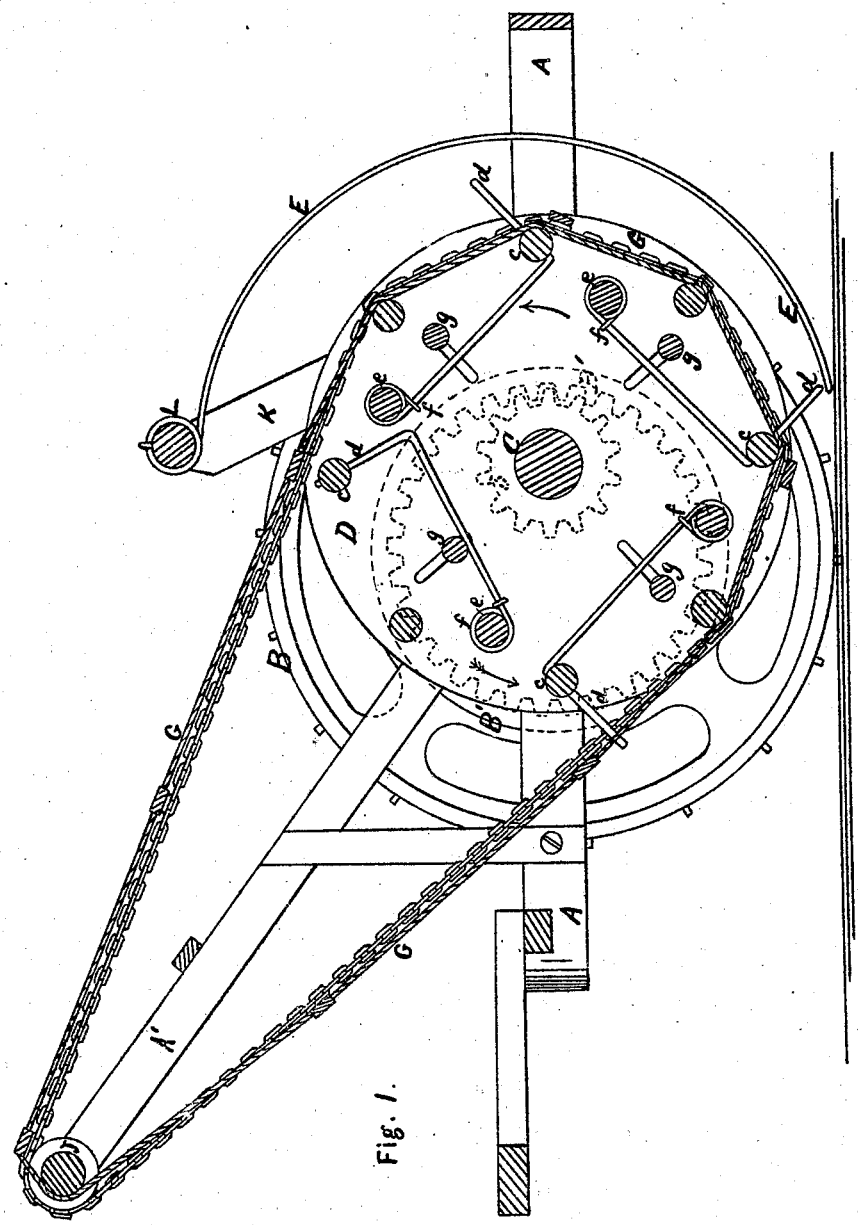

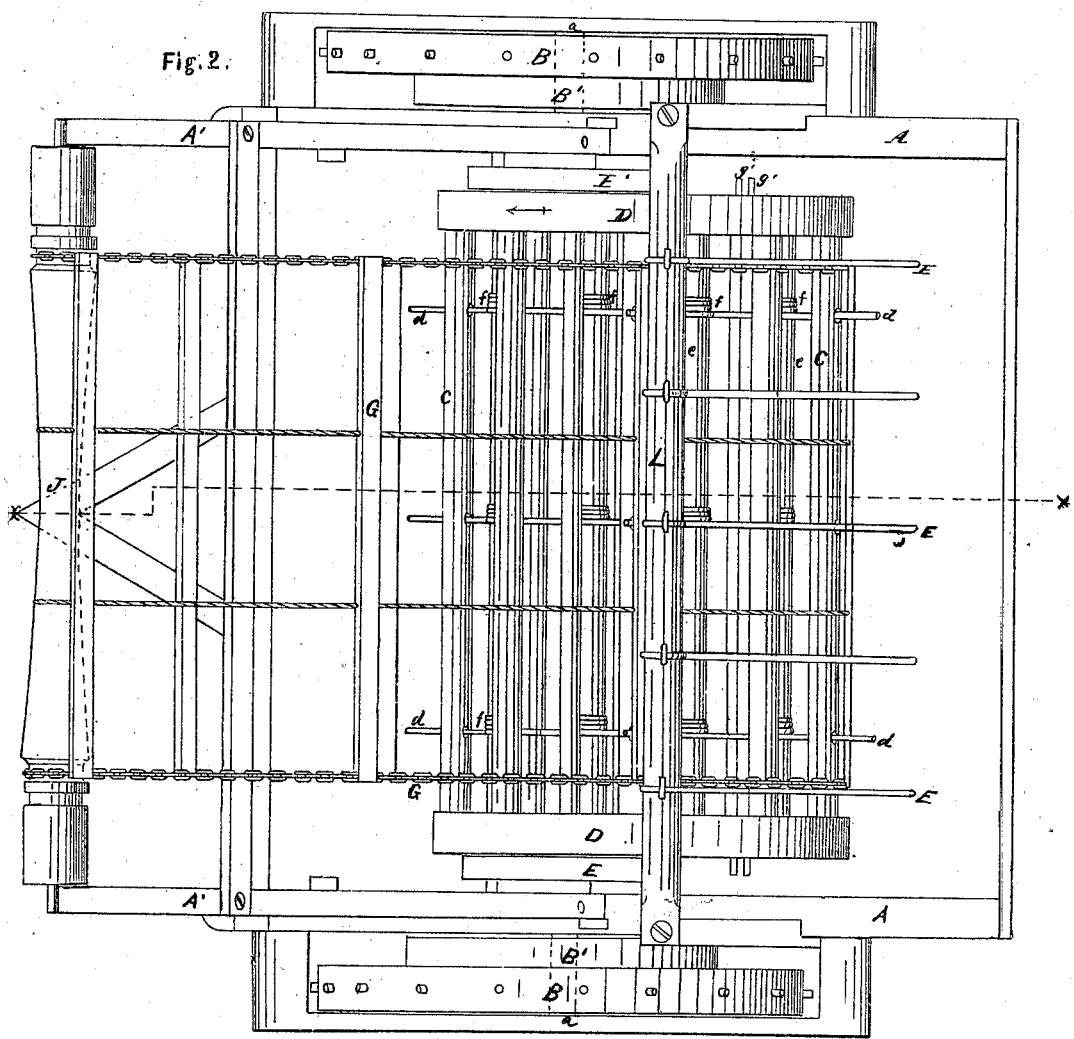
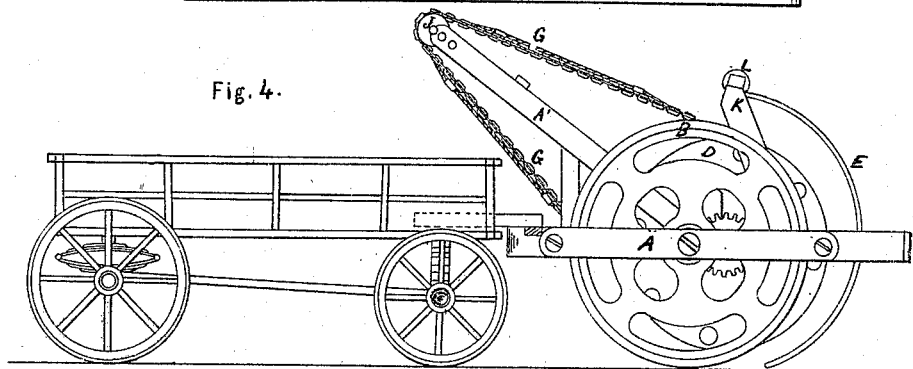

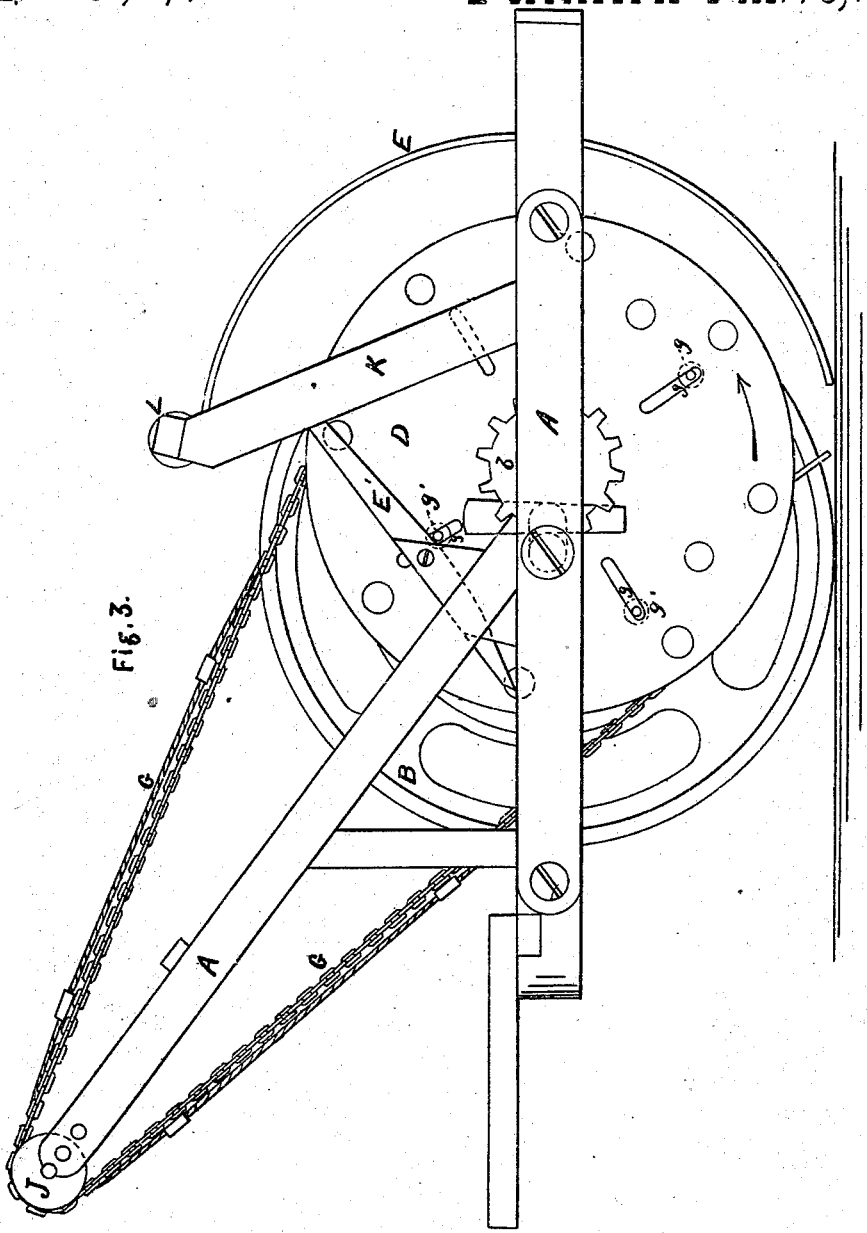

F. M. ROBINSON AND T. G. SPRINGER, OF CONNEAUTVILLE, PENNSYLVANIA.

Letters Patent No. 66,741, dated July 16, 1867.

---

IMPROVEMENT IN HAY-RAKERS AND LOADERS.

---

The Schedule referred to in these Letters Patent and making part of the same.

---

TO ALL WHOM IT MAY CONCERN:

Be it known that we, F. M. ROBINSON and T. G. SPRINGER, of Conneautville, in the county of Crawford, and State of Pennsylvania, have invented a new and improved Machine for Loading Wagons with Hay; and we do hereby declare that the following is a full, clear, and exact description thereof, reference being had to the accompanying drawings, making a part of this specification, in which—

Figure 1 is a longitudinal section taken in a vertical plane through the hay-loader.

Figure 2 is a top view of the machine.

Figure 3 is an elevation of one side of the machine, with one of the carriage-wheels removed.

Figure 4 is a side view of the machine attached to the rear end of a wagon.

Similar letters of reference indicate corresponding parts in the several figures.

The object of this invention is to combine with spring rake-teeth, which are adapted for gathering up scattered hay, a revolving toothed drum, which will gather the hay from the rake-teeth and deliver it upon an endless carrier; said parts being mounted upon a carriage, and arranged in such manner that when applied behind a wagon, they will gather hay from the ground and deliver it into the wagon, as will be hereinafter described.

To enable others skilled in the art to understand our invention, we will describe its construction and operation.

In the accompanying drawings, A represents a carriage-frame which is mounted upon two transporting-wheels B B applied outside of said frame to short axles $a$ $a$, as indicated in fig. 2. C represents a transverse shaft, which projects through the side beams of frame A, and carries on its ends pinion spur-wheels $b$ $b$, which engage with teeth of the inside gear B' B', so that these wheels impart a rapid rotary movement to the shaft C, when the machine is moved forward. Near the ends of shaft C, and suitably secured on this shaft, inside of frame A, are two large circular heads D D, which are connected together by a number of transverse bars, $c$ $c$, secured at equal distances apart around shaft C. Through bars $c$ $c$ holes are made, through which pass the teeth $d$ $d$ which gather the hay from the rake-teeth E; these teeth $d$ $d$ are bent as shown in the sectional view, fig. 1, and their inner ends are pivoted in a suitable manner to the fixed transverse bars $e$ $e$. Around these bars $e$ springs $f$ are coiled, and applied to the teeth $d$ so as to press the gathering-ends of these teeth outward against their bars $c$ $c$. Between the bars $c$ and $e$ are movable bars $g$, the ends $g'$ $g'$ of which project through radial slots which are made through the heads D D, so as to be acted upon by the inclined bars E' E', which are secured to the side bars of frame A, as shown in figs. 2 and 3. These inclined bars E' are arranged in such relation to the upper termination of the rake-teeth, that, as the heads D revolve in the direction indicated by the arrows in figs. 1, 3, and 4, these bars E' will move the rods $g$ inward, and cause the gathering-ends of the teeth $d$ to recede from the endless carrier G, thus leaving the hay upon this carrier to be elevated and deposited in a wagon. As the teeth $d$ successively leave the hay, and their pressure-bars or rods $g$ leave the lower ends of the inclined bars E', these teeth are again projected so as to take the hay upward so as to leave it on the endless carrier G. This endless carrier G consists of endless chains or their equivalents, which are passed around the rotary drum, and are carried upward and forward and passed around a roller, J, which has its end bearings upon the inclined frame A'. Two posts K K are erected upon the sides of frame A, and upon their upper ends a horizontal transverse bar, L, is secured, around which the rake-teeth E are coiled and attached. These rake-teeth curve backward and downward, and touch the ground directly below the revolving drum, so as to gather up the hay as the machine is drawn along. The teeth $d$ $d$ then pass around and elevate the hay thus gathered, leaving it upon the endless carrier G.

By this arrangement of the rake the teeth not only serve for gathering up the scattered hay, but they also serve as guards for allowing the revolving teeth to elevate the hay and leave it upon the carrier.

To use the machine it is attached behind a wagon, as represented in fig. 4.

Having described our invention, what we claim as new, and desire to secure by Letters Patent, is—

1. The hooked or bent spring-teeth $d$, applied to the revolving drum D, guided by means of bars $c$, and acted upon at proper times, so as to leave the hay upon the endless chain or carrier G, by means of rods $g$ and cams or inclined bars E', substantially as described.

2. The hooked or bent spring-teeth $d$, applied to the revolving drum D, guided by means of bars $c$, and acted upon at proper times, so as to leave the hay upon the endless carrier G, by means of rods $g$ and cams or inclined bars E' substantially as described, in combination with the spring-rake E, the teeth of which are arranged so as to rake up the hay, and also serve as guards for the spring-teeth $d$ in elevating hay, substantially as herein specified.

3. The hooked or bent spring teeth $d$, applied to a revolving drum D, guided by means of bars $c$, and acted upon at proper times, so as to leave the hay upon the endless carrier G, by means substantially as described, in combination with means, substantially as described, of communicating a rapid rotary motion to said drum D, so that the speed of this drum shall be greater than that of the driving-wheels, substantially as specified.

F. M. ROBINSON,
T. G. SPRINGER.

Witnesses:
CHAS. W. RENIFF,
M. C. TEASDALE.